Nov. 22, 1927. Re. 16,788

L. S. BAIER

MACHINE FOR MAKING ICE CREAM CONTAINERS

Original Filed Jan. 24, 1924 3 Sheets-Sheet 1

Inventor
L. S. Baier.
By
Albert E. Dieterich
Attorney

Nov. 22, 1927. Re. 16,788
L. S. BAIER
MACHINE FOR MAKING ICE CREAM CONTAINERS
Original Filed Jan. 24, 1924 3 Sheets-Sheet 2
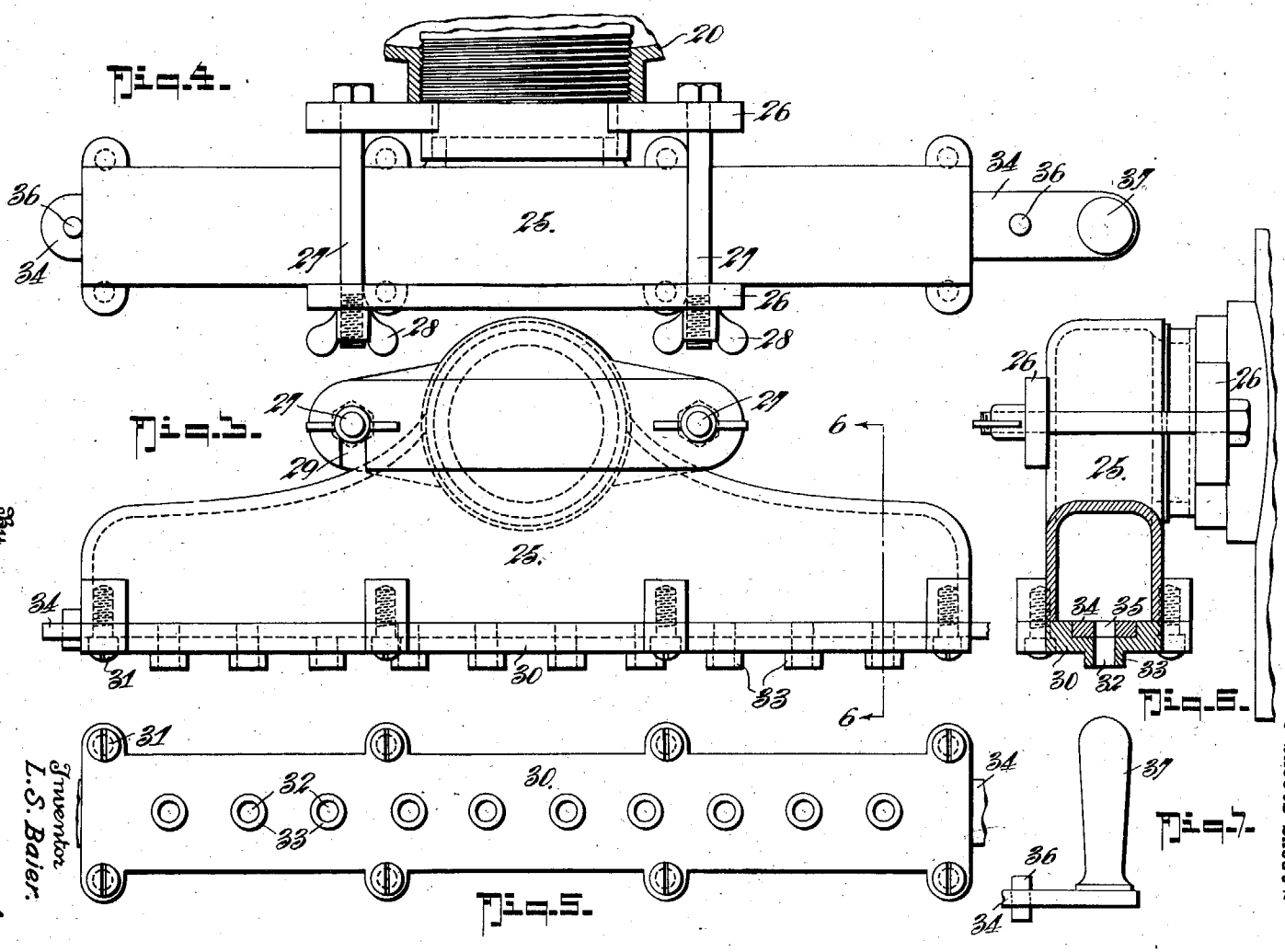
Inventor
L. S. Baier.
By Albert R. Dietrich
Attorney Nov. 22, 1927. Re. 16,788
L. S. BAIER
MACHINE FOR MAKING ICE CREAM CONTAINERS
Original Filed Jan. 24, 1924 3 Sheets-Sheet 3
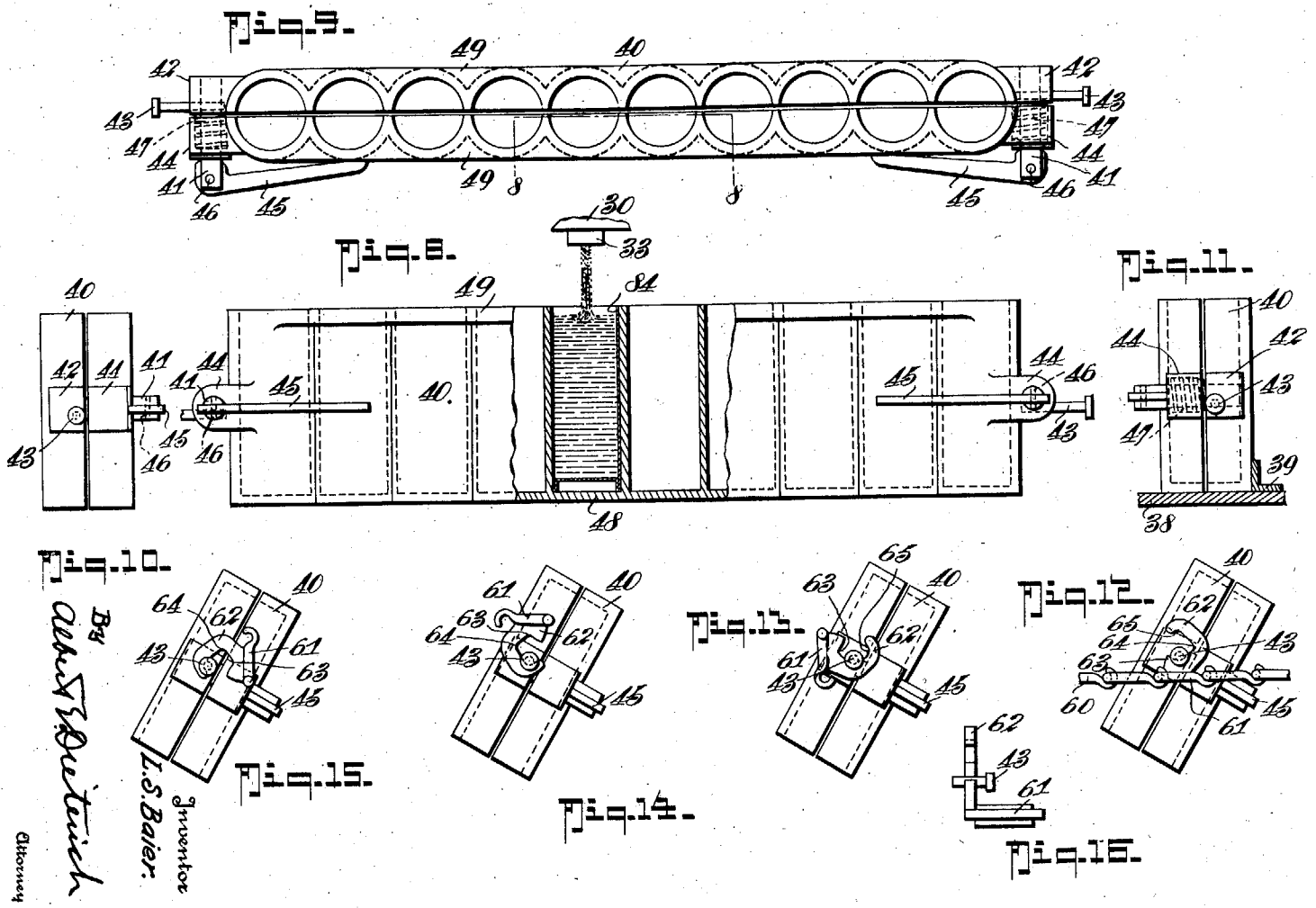
Inventor
L. S. Baier.
By
Albert E. Dieterich
Attorney Reissued Nov. 22, 1927. Re. 16,788

UNITED STATES PATENT OFFICE.

LUDWIG S. BAIER, OF PORTLAND, OREGON, ASSIGNOR TO ICE CREAM SMACK PRODUCTS COMPANY, OF PORTLAND, OREGON.

MACHINE FOR MAKING ICE-CREAM CONTAINERS.

Original No. 1,552,192, dated September 1, 1925, Serial No. 688,216, filed January 24, 1924. Application for reissue filed July 2, 1927. Serial No. 203,221.

This invention relates more particularly to machines for making chocolate cylinders intended to be used as containers for vending ice cream.

An object of my invention is to provide an exceedingly simple and efficient means for making chocolate cylinders closed at one end and reinforced with paper.

A second object is the construction of a machine in a manner that the product may be cooled rapidly and uniformly in order to prevent a change in the character or appearance of the chocolate.

A third object is the construction of a special form of mold for forming the product inexpensively, and to make same simple in operation, not liable to get out of order and dependent only upon such facilities as can be found in all localities.

A fourth object is the securing of a gentle discharge of the molds from the chains which carry the molds through the cooling room or chamber of the machine upon a resilient conveyor.

A fifth object is the provision of an exceedingly simple means for collecting the surplus chocolate and drip from the molds in a form in which it may be readily returned to the chocolate holding container.

By way of explanation I wish to state that the finished product of this machine which is fully described in an application, Serial Number 703,066, is a cylinder of paper, preferably of an oil resisting parchment, which is held in cylindrical form by curling one of its ends inwardly and placing upon the curled edge a disk of paper much after the fashion that the paper wad of a shot gun shell engages its crimped edges. The paper cylinder thus formed has an open end through which it is filled, or partly filled, with melted chocolate and immediately emptied, drained and cooled.

The operation performed, therefore, may be briefly described as filling, emptying and cooling, and it is to perform these steps in their proper order and manner that I have constructed this machine.

I accomplish these results in the manner set forth in the following specification and illustrated in the accompanying drawings, in which:

Figure 3 is a front elevation of the distributing head on an enlarged scale, of which Figure 4 is a plan and Figure 5 a bottom view.

Figure 6 is a vertical section along the line 6—6 in Figure 3.

Figure 7 is an elevation of the end of the operating slide.

Figure 8 is a front elevation of one of the molds of which

Figure 9 is a plan,

Figure 10 is a left end elevation and

Figures 1, 2:
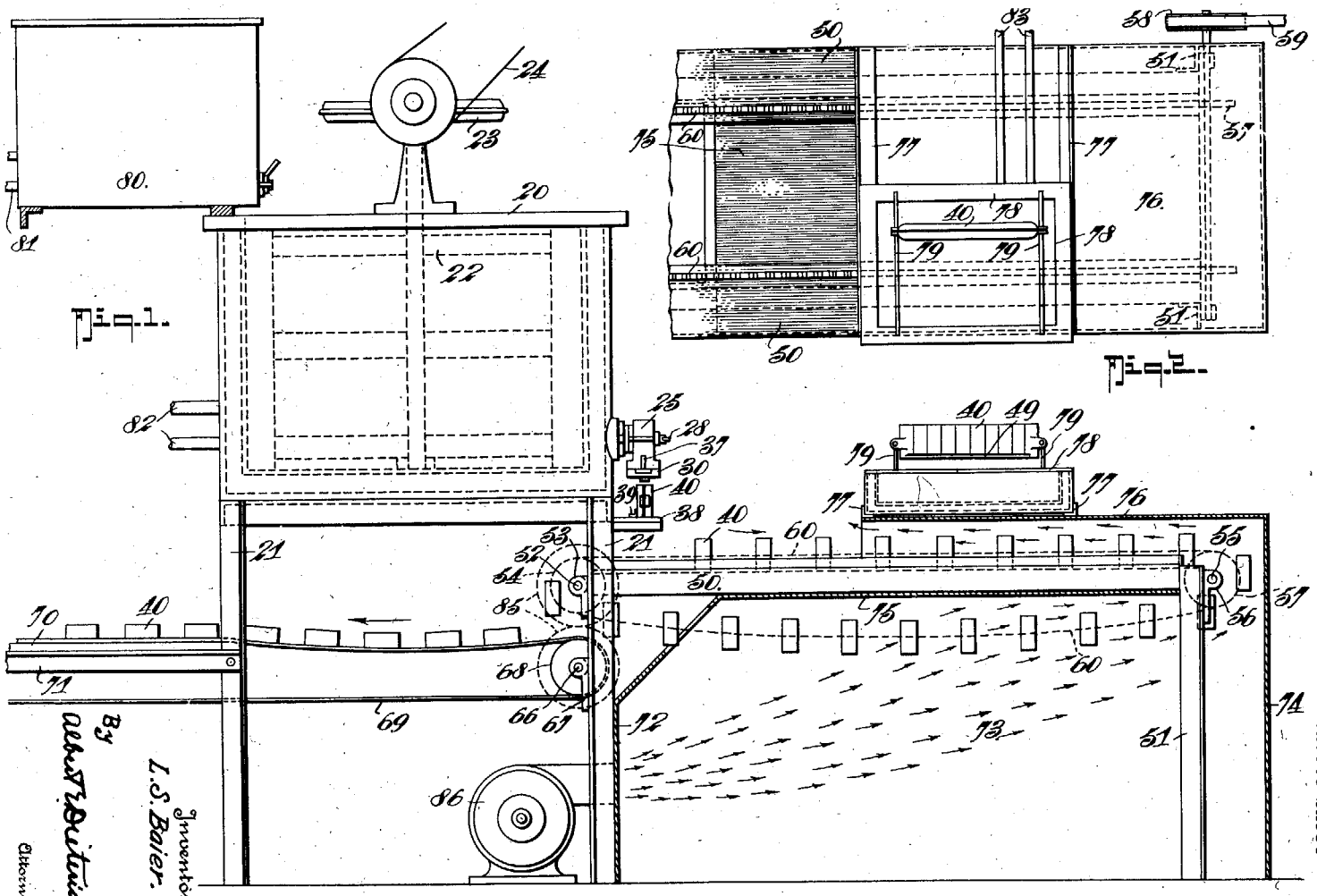
Figure 1 is a front elevation of my device with the walls of the cooling chamber cut away to expose the parts within.
Figure 2 is a plan of the cooling end of the machine.

Figure 11 a right end elevation showing the mold in place on the filling shelf.

Figure 12 shows the relation of the chain hooks to the supporting trunnions of the molds at the time they are placed in the machine.

Figure 13 shows the position of the hooks as the chain is descending.

Figure 14 shows the position of the hooks when the chain is on its under run and at the moment the chain begins to rise.

Figure 15 shows the position of the hooks when the mold is about to be discharged from the chains.

Figure 16 is a detail showing the form of special link in which the hook is incorporated for the purpose of suspending the molds.

Similar numbers of reference refer to the same parts throughout the several views.

Referring in detail to the drawings, I have chosen to illustrate my machine in a somewhat conventional and diagrammatic manner in which the usual form of chocolate mixer 20 is mounted on the raised legs 21. This mixer is well known in the confectioner's art and is employed to maintain a quantity of chocolate at a given temperature, and at the same time thoroughly mix same. This is accomplished by providing the usual form of agitator 22 driven through the gearing 23 from the belt 24, or in any other manner. On the side of the mixer 20 is attached a distributor head 25 by means of the bar clamps 26 and the bolts 27 provided with the wing nuts 28. The outer bar 26 is preferably provided with a slot 29 to permit the ready removal of the distributor head 25 without the complete removal of the wing nuts 28.

Across the bottom of the distributor head 25 is placed a cover plate 30 held in place by the screws 31. Ports 32 are formed at regular intervals along the under side of the cover plate 30, each of which passes through the projection 33. A slide 34 whose holes 35 can be made to register with the ports 32 is held between the cover plate 30 and the under side of the distributor head 25. Stop pins 36 are placed on the slide 35 to limit its travel to the wide open or completely closed positions. A handle 37 is also secured on the slide 34.

Attached to the uprights 21 is a shelf 38 provided with an angle 39 against which may be placed a multiple mold 40 consisting of two halves joined together by the rods 41 which are pinned to the projecting lugs 42 of one mold by the projecting pin 43, and which slidably pass through the projecting lugs 44 of the second portion of the mold. The ends of the rods 41 which project from the lugs 44 are provided with eccentric handles 45 pivotally mounted on the rivets 46 in slots in the rods 41. The projecting lugs 44 are recessed to receive the springs 47 which urge the parts of the mold 40 apart, or against the eccentric 45. The lower end 48 of the mold, it will be understood, is closed and the upper end, for the sake of convenience and strength, is provided with a straight flange 49.

Attached to the uprights 21 is a table 50 whose farther end is supported by the legs 51. A shaft 52 journals in the bearings 53 on the upright legs 21 and is provided with sprockets 54. A shaft 55 journals in the bearings 56 mounted on the legs 51 and carries the sprockets 57. The shaft 55 is driven through the pulley 58 by the belt 59 from any convenient source of power.

Sprocket chains 60 pass around the sprockets 54 and 57 and have placed at regular intervals the special links 61 provided with the open hooks 62 illustrated in Figures 12 to 16 inclusive. Each of these hooks is provided with three corners 63, 64 and 65 whose purpose will be explained later.

A shaft 66 journaling in the bearing 67 is mounted on the legs 21 and carries a wide pulley 68 which drives a conveyor belt 69 of any desired length. The upper run of the conveyor belt 69, outside of the legs 21, is supported by a table 70 which rests on the angle iron frame 71 preferably joined to the legs 21 and supported at their outer end by other legs not shown. It is, of course, desirable to provide an idler pulley for the conveyor belt 69 (not shown), at the extreme end of the table 70.

Between the legs 21 and 51 is formed a cooling room which projects over the end of the machine to include the sprockets 57. This room is formed by the vertical walls 72, 73 and 74 and the horizontal walls 75 and 76. A fan 86 is provided for supplying a current of cool air to the room thus formed in order to properly reduce the temperature of the molds and contents as they pass through this room.

On top of the member 76 I have placed the angle irons 77 which support a water jacketed pan 78 provided with the arches 79 spaced to receive a mold 40 in order that the surplus chocolate may drip therefrom while the next mold is being filled.

Above the mixer 20 I have provided a preheater 80 where new chocolate and chocolate from the pans 78 may be brought to the desired temperature before they are admitted to the mixer 20, thereby insuring absolute uniformity of temperature at the distributing head 25.

The usual hot water and pipes 81, 82 and 83 and heating apparatus, thermostatic controls, thermometers, etc., are of course employed, although the latter of which are not illustrated, as these are well understood by those familiar with this class of machines.

The operation of my device is as follows: Paper cylinders 84 are placed in the mold 40 and the eccentric handles 45 are moved to the position shown in Figure 9 which causes the springs 47 to be compressed and the parts of the molds forced together and the paper cylinders to retain their form regardless of the filling or emptying operation about to be performed.

The mold 40 is now placed on the shelf 38 and the slide 34 moved by means of the handle 37 causing the chocolate to flow into the various paper cylinders. The flow of chocolate is cut off by reversing the movement of the slide 34 when a sufficient amount of chocolate has been introduced.

The mold 40 is now placed in an inverted position upon the arches 79 causing the surplus chocolate to fall and drip into the pan 78. While this dripping is taking place another mold 40 is similarly filled and placed on the arches 79 and the first mold 40 is suspended on the chains 60. Confectioner's paper is placed over the member 75 to catch what remaining chocolate may drip from the molds. This can be removed by merely curling the paper at times when the machine is not in operation and put back into the preheater 80.

It will be observed that the mold 40, which has been placed upon the chains 60, is now carried underneath the pan 78 and beneath the wall 76 and then back through the cooling room and is finally dropped off upon the belt 69, which, in turn, is driven by the gears 85 in a manner to carry the molds out upon the table 70 where they are opened, preferably by one operator, and the product packed into boxes by a second operator, in order that they may not become stained in handling.

In practice, under some conditions it may be desired to permit the lower run of the chain 60 to fall low enough to permit the pan 78 to be placed under the upper run of the chains, thereby eliminating the necessity of a second handling of the molds themselves.

The manner of inserting the chocolate into the molds may vary from pouring, as above described, to injecting in the form of a spray or stream either in the position indicated, or in an inverted position, without departing from the spirit of my invention.

It will be observed that as the molds fall from the hooks 62 that they lie upon the unsupported upper run of the belt 69 in order to make their stop as gentle as possible, but later find their way upon the table 70 where they may be more readily disposed of.

While it is possible to drive the apparatus by hand power, it has been found exceedingly desirable to operate same continuously in order to provide a uniform handling of all of the product which passes through the machine.

It will be observed that in Figures 12 to 15 inclusive, I have illustrated the molds in an inclined position, while in Figure 1 they are shown in a vertical position. Either form may be employed by the proper location of the mold trunnions, but the inclined form is more desirable, since it tends to seal the seam in the paper cylinder better than when the mold is held vertical during the dripping process.

I claim:

1. A sectional mold for use in forming paper-covered chocolate cylinders consisting of a split form having a plurality of cylindrical recesses formed therein in a manner so that the plane of separation of the mold sections will bisect all of said recesses, one of the sections of the mold having a rod projecting from each end thereof through an adjacent lug on the other mold section, springs on said rods for urging the sections of the mold apart, eccentric handles on said rods adapted to force the sections of the mold together and trunnions located at each end of the mold; and means for supporting said mold by its trunnions in an inverted position.

2. A mold for chocolate cylinders consisting of a frame having cylindrical cavities formed therein, said frame having trunnions formed at each end thereof below the center of gravity of said mold when in an upright position; and a pair of conveyor chains, including hooks placed at regular intervals along said chains, said hooks being adapted to support said trunnions in the travel of said mold along said conveyor until they begin to return to the upper run of said conveyor at which point said trunnions will slip out of said hooks and release said mold.

3. A machine for making paper-covered chocolate cylinders having, in combination, a chocolate mixer; a pair of conveyor chains below said mixer; a plurality of molds adapted to be supplied with paper linings adapted to be carried between said chains in an inverted position; means for injecting chocolate into said paper linings from said mixer; a receptacle for receiving surplus chocolate from said molds; a cooling chamber through which said molds are carried by said chains; and a pre-heater for bringing chocolate up to the required temperature before placing same in said mixer.

4. In a machine of the character described, a sectional mold, means securing the mold sections together, trunnions on the ends of the mold, an endless conveyor including chains having hooks to receive said trunnions and convey the mold from place to place, said hooks including means for releasing the mold from the chains by gravity at a predetermined place.

5. In a machine of the character described, a sectional mold, means securing the mold sections together, trunnions on the ends of the mold, an endless conveyor including chains having hooks to receive said trunnions and convey the mold from place to place, said hooks comprising members each having a triangular recess, the three corners of which in turn receive said trunnions during the travel of the conveyor.

6. In a machine for making paper-covered chocolate cylinders, molds having cavities to receive paper cylinders and having trunnions, a chocolate reservoir having means for supplying chocolate to the cylinders located within the mold cavities, a mold conveyor below said reservoir, said conveyor including a pair of endless chains spaced apart, said chains having elements to receive said trunnions and convey the molds along the upper run of the conveyor, then around one bend of the conveyor and along the lower run of the conveyor and including means to automatically release the mold trunnions from the chains as the said elements start upwardly around the other bend of the conveyor whereby the molds will be dropped by gravity from said conveyor, and means for catching the dropped molds.

7. In a machine for making paper-covered chocolate cylinders, molds having cavities to receive paper cylinders and having trunnions, a chocolate reservoir having means for supplying chocolate to the cylinders located within the mold cavities, a mold conveyor below said reservoir, said conveyor including a pair of endless chains spaced apart, said chains having elements to receive said trunnions and convey the molds along the upper run of the conveyor, then around one bend of the conveyor and along the lower run of the conveyor and including means to automatically release the mold trunnions from the chains as the said elements start upwardly around the other bend of the conveyor whereby the molds will be dropped by gravity from said conveyor, and means for catching the dropped molds, said catching means comprising a second conveyor onto which the molds are dropped and by which they are carried from the machine.

8. In a machine for making paper-covered chocolate cylinders, molds having cavities to receive paper cylinders and having trunnions, a chocolate reservoir having means for supplying chocolate to the cylinders located within the mold cavities, a mold conveyor below said reservoir, said conveyor including a pair of endless chains spaced apart, said chains having elements to receive said trunnions and convey the molds along the upper run of the conveyor, then around one bend of the conveyor and along the lower run of the conveyor and including means to automatically release the mold trunnions from the chains as the said elements start upwardly around the other bend of the conveyor whereby the molds will be dropped by gravity from said conveyor, a second conveyor to receive the molds which are dropped from the first conveyor, a table associated with said second conveyor to which the molds are carried by said second conveyor, said second conveyor comprising a belt, that portion thereof onto which the molds are dropped being yieldable to break the fall of the molds.

9. In a machine for making paper-covered chocolate cylinders, a chocolate mixer; a pair of conveyor chains below said mixer; a set of molds adapted to be carried by and between said chains and having recesses to receive paper linings; means for injecting chocolate from said mixer into said linings; a receptacle to receive surplus chocolate from said molds; a cooling room through which molds are carried by said chains, and means to release the molds with their contents from the conveyor chains at a definite place.

10. In a machine for making paper-covered chocolate cylinders, a chocolate mixer; a pair of conveyor chains below said mixer; a set of molds adapted to be carried by and between said chains and having recesses to receive paper linings; means for injecting chocolate from said mixer into said linings; a receptacle to receive surplus chocolate from said molds; a cooling room through which said molds are carried by said chains, and means to release the molds with their contents from the conveyor chains at a definite place, a table outside the cooling room, a belt conveyor onto which the released molds are deposited and by which the molds are delivered onto said table.

11. In a machine for making paper-covered chocolate cylinders, a chocolate mixer; a pair of conveyor chains below said mixer; a set of molds adapted to be carried by and between said chains and having recesses to receive paper linings; means for injecting cholocate from said mixer into said linings; a receptacle to receive surplus chocolate from said molds; a cooling room through which said molds are carried by said chains, and means to release the molds with their contents from the conveyor chains at a definite place, a table outside the cooling room, a belt conveyor onto which the released molds are deposited and by which the molds are delivered onto said table, said belt conveyor including a yieldable mold catching portion for the purposes specified.

12. In a machine of the character described, a sectional mold, means securing the mold sections together, trunnions on the ends of the mold, an endless conveyor including chains having hooks to receive said trunnions and convey the mold from place to place, said hooks including means for releasing the mold from the chains by gravity at a predetermined place, said trunnions being located to one side of the dividing plane of the mold and so located with respect to the center of gravity of the mold that the mold will be carried by the chains in an inverted and inclined position for the purposes specified.

13. A machine for making paper covered chocolate cylinders having in combination, a chocolate holder with means to maintain the chocolate therein in a fluid state, a conveyor below said holder; a plurality of split molds adapted to be supplied with paper linings and adapted to be carried by said conveyor in an inverted position; means for introducing chocolate from said holder into said linings; a receptacle for receiving surplus chocolate from said molds; and means removably mounting said molds upon said conveyor.

LUDWIG S. BAIER.